US009208212B2

(12) United States Patent
Niehoff et al.

(10) Patent No.: US 9,208,212 B2
(45) Date of Patent: Dec. 8, 2015

(54) FIELD EXTENSIBILITY IN A MULTI-TENANT ENVIRONMENT WITH COLUMNAR DATABASE SUPPORT

(71) Applicant: SAP AG, Walldorf (DE)

(72) Inventors: Daniel Niehoff, Sinsheim (DE); Uwe Schlarb, Oestringen (DE); Georg Wilhelm, Nussloch (DE); Daniel Figus, Wallduern (DE); Daniel Wachs, Frankenthal (DE); Rene Dehn, Sinsheim (DE)

(73) Assignee: SAP AG, Walldorf (DE)

( * ) Notice: Subject to any disclaimer, the term of this patent is extended or adjusted under 35 U.S.C. 154(b) by 335 days.

(21) Appl. No.: 13/717,132

(22) Filed: Dec. 17, 2012

(65) Prior Publication Data

US 2014/0172775 A1    Jun. 19, 2014

(51) Int. Cl.
*G06F 17/30* (2006.01)

(52) U.S. Cl.
CPC .... *G06F 17/30587* (2013.01); *G06F 17/30315* (2013.01); *G06F 17/30595* (2013.01)

(58) Field of Classification Search
CPC .................... G06F 17/30587; G06F 17/30289; G06F 17/30292

USPC ......................................................... 707/803
See application file for complete search history.

(56) References Cited

U.S. PATENT DOCUMENTS

| 2006/0161533 | A1* | 7/2006 | Selca et al. ........................ 707/3 |
| 2011/0153576 | A1* | 6/2011 | Figus ............................. 707/692 |
| 2011/0238709 | A1 | 9/2011 | Liu et al. |
| 2012/0166620 | A1 | 6/2012 | Said et al. |

OTHER PUBLICATIONS

Haitham Yaish, An Elastic Multi-tenant Database Schema for Software as a Service, 2011, IEEE Computer Society, p. 727-743.*
"Columnar database," SearchDataManagement, searchdatamanagement.techtarget.com, visited Dec. 13, 2012, 13 pages.
"How an Extension Table Stores Custom Data," Configuring Siebel Business Applications, visited Dec. 7, 2012, 6 pages.
"Join (SQL)," Wikipedia, visited Dec. 7, 2012, 15 pages.

* cited by examiner

*Primary Examiner* — Thu-Nguyet Le
(74) *Attorney, Agent, or Firm* — Klarquist Sparkman, LLP

(57) ABSTRACT

A multi-tenant environment can support field extensibility via extension tables. An in-memory, columnar database can store a core table being extended as well as the corresponding extension table. Transactional and analytical processing can be performed on the extension fields. A business-objects-based system can take advantage of the technologies to provide greater flexibility, security, and performance improvements.

18 Claims, 13 Drawing Sheets

| 320A EXTENSION TABLE | | |
|---|---|---|
| TEN. | NODE_ID | $EF_1$ |
| 001 | ABC | 12 |
| 001 | TZU | 5 |

| 310 CORE TABLE | | | |
|---|---|---|---|
| TEN. | NODE_ID | $F_1$ | $F_2$ |
| 001 | ABC | 1.1.12 | MEYER |
| 001 | XYZ | 3.9.13 | OPK |
| 003 | TZU | 3.9.11 | MMM |
| 003 | OPL | 3.9.13 | OPK |

| 320B EXTENSION TABLE | | | |
|---|---|---|---|
| TEN. | NODE_ID | $EF_1$ | $EF_2$ |
| 003 | TZU | Y | BLUE |
| 003 | OPL | N | |

TABLE SET 1010

OPPORTUNITY_ROOT (CORE TABLE)

| CLNT | NODE_ID | DATE | SHIPTO |
|---|---|---|---|
| 003 | TZU | 3.9.11 | MMM |
| 003 | OPL | 3.9.13 | OPK |

FIG. 10B

TABLE SET 1020

OPPORTUNITY_ROOT

| CLNT | NODE_ID | DATE | SHIPTO |
|---|---|---|---|
| 003 | TZU | 3.9.11 | MMM |
| 003 | OPL | 3.9.13 | OPK |

EXTENSION TABLE

| CLNT | NODE_ID | COLOR | CAT. | PAPER |
|---|---|---|---|---|
| 003 | TZU | | | |
| 003 | OPL | | | |

FIG. 10C

TABLE SET 1030

OPPORTUNITY_ROOT

| CLNT | NODE_ID | DATE | SHIPTO |
|---|---|---|---|
| 003 | TZU | 3.9.11 | MMM |
| 003 | OPL | 3.9.13 | OPK |
| 003 | HGH | 1.12 | POI |

EXTENSION TABLE

| CLNT | NODE_ID | COLOR | CAT. | PAPER |
|---|---|---|---|---|
| 003 | TZU | | | |
| 003 | OPL | | | |
| 003 | HGH | GREEN | 001 | X |

FIG. 10D

TABLE SET 1040

OPPORTUNITY_ROOT

| CLNT | NODE_ID | DATE | SHIPTO |
|---|---|---|---|
| 003 | TZU | 3.9.11 | MMM |
| 003 | OPL | 3.9.13 | OPK |
| 003 | HGH | 1.12 | POI |

EXTENSION TABLE

| CLNT | NODE_ID | COLOR | CAT. | PAPER |
|---|---|---|---|---|
| 003 | TZU | | 002 | |
| 003 | OPL | | | |
| 003 | HGH | GREEN | 001 | X |

1000

FIELD EXTENSIBILITY IN A MULTI-TENANT ENVIRONMENT WITH COLUMNAR DATABASE SUPPORT

BACKGROUND

Responsive to customer demand, software developers can provide comprehensive database systems that are preconfigured to address a wide variety of business computing scenarios. However, regardless of the amount of work put into the system, customers still frequently require customization of the system. For example, a customer may wish to add a field to a database table to track information specific to a business process that the customer finds indispensable.

A conventional approach is to simply add another column to the database. However, such an approach is problematic in a multi-tenant environment. Because each tenant may have different business process needs, such an approach is not feasible. First, the fields may conflict or be inconsistent. Second, tenant isolation principles require that one tenant not see how the fields added by the other tenant are configured. There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Field extensibility in a multi-tenant environment can be supported as described herein. Fields can be added to business object nodes represented by tables in an in-memory, columnar database, and a one-to-one relationship between business object nodes and database tables can be implemented. An extension table can contain and persist extension fields. A framework for implementing field extensibility can facilitate processing of business object nodes that have been extended.

As described herein, a variety of other features and advantages can be incorporated into the technologies as desired.

BRIEF DESCRIPTION OF THE DRAWINGS

FIG. 3 is a block diagram of an exemplary extension table arrangement.

FIGS. 10A-D are block diagrams of an exemplary extension table implementation showing table life cycle in a multi-tenant scenario.

DETAILED DESCRIPTION

Example 1

Exemplary Overview

The technologies described herein can be used for field extensibility in a variety of scenarios. Adoption of the technologies can provide efficient actions on data in both transactional and analytical scenarios while allowing customers the flexibility to customize business objects for desired business processes.

The technologies can be helpful for those wishing to customize data processing systems that include both online transaction processing and online analytical processing. Tenant isolation can be maintained and flexibility provided. Beneficiaries include the service provider who wishes to provide a customizable computing system implementing comprehensive and complex preconfigured business processes. Customers can also benefit from the technologies because changes to the preconfigured system can be easily implemented to meet user requirements.

Using the technologies herein, extension fields can be used in the same manner as standard fields, such as in business transactions or as selection criteria in business analytics.

Example 2

Exemplary System Implementing Field Extensibility

Figure 1:
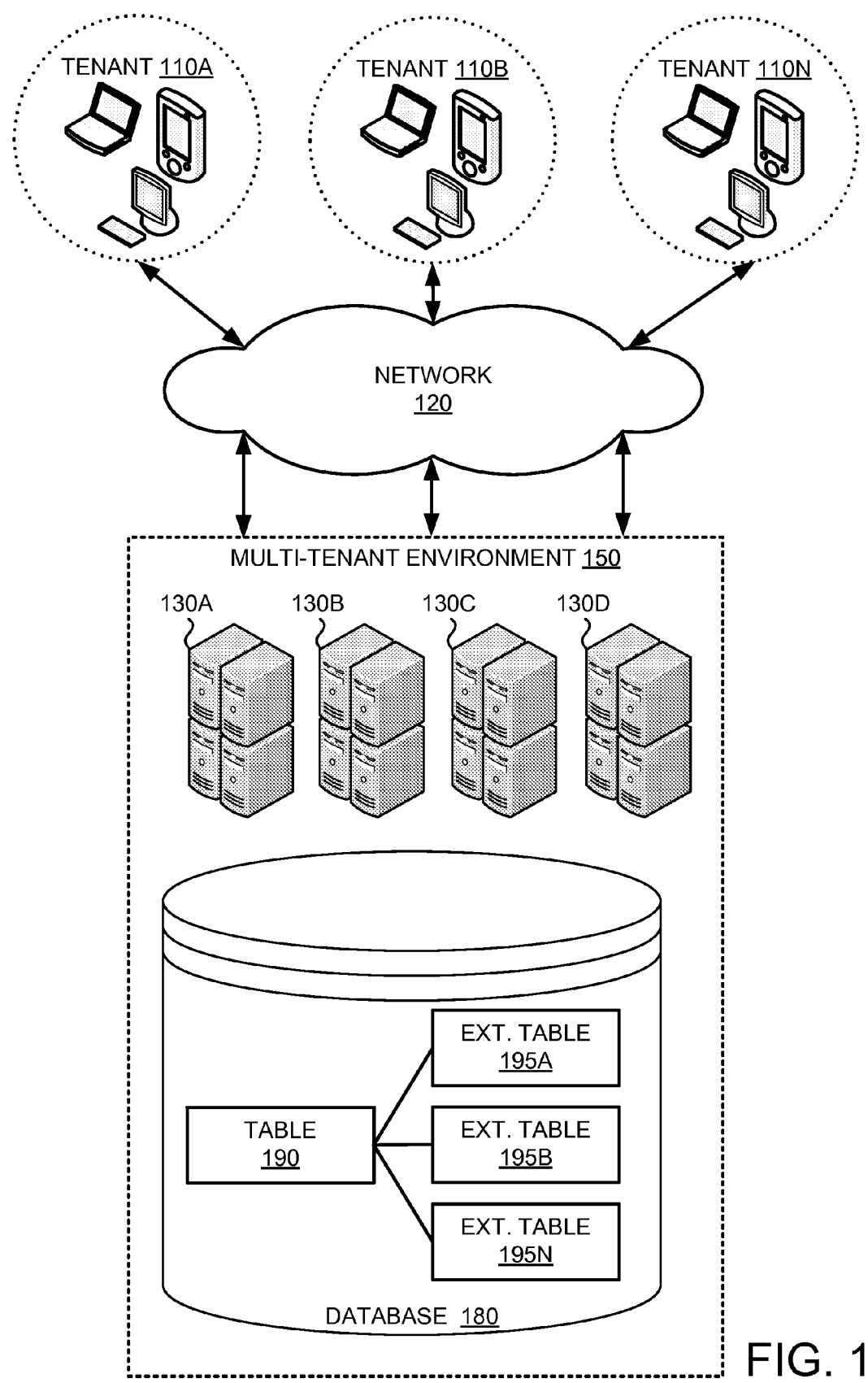
FIG. 1 is a block diagram of an exemplary system implementing field extensibility via extension tables.

FIG. 1 is a block diagram of an exemplary system 100 implementing field extensibility via extension tables as described herein. In the example, a plurality of tenants 110A-N access, via a network 120, a multi-tenant environment 150 that includes supporting hardware 130A-D. The environment 150 provides a variety of database services via a database 180 with a plurality of database tables. An exemplary table 190 includes one or more extension tables 195A-N for respective of the tenants 110A-N. In practice, a table may have no associated extension tables, or fewer than one per tenant (e.g., if there are no extension fields for the tenant).

The tenants 110A-B and the network 120 are shown for context and need not be implemented as part of the technology. Further the supporting hardware 130A-D can vary greatly and need not be implemented as part of the technology.

The network 120 can be the Internet or some other public network, a private network, a virtual private network, or the like.

The database 180 can persist a plurality of business object instances (e.g., of one or more business object types) in one or more computer-readable storage media. The database can be implemented as an in-memory, columnar database representing business objects and their nodes. A business object node table can comprise records identified by a primary key as described herein.

Respective of the business object instances can be persisted as a single persistence in the database as described herein. For example, both online analytical processing (OLAP) and online transaction processing (OLTP) services can be provided with a single persistence. The database 190 can be implemented to be transaction-safe and support enterprise-class database features such as point-in-time recovery, backup and restore, and the like.

An extension table 195A, B, N can represent one or more extension fields for a node of a business object. Such an extension table can comprise records identified by the same primary key as the core table, thereby logically adding the extension fields to the business object (e.g., the business object node) for transactional and analytical processing.

In practice, the systems shown herein, such as system 100 can vary in complexity, with additional functionality, more complex components, and the like. For example, additional components can be included to implement security, report design, and the like. An extension fields framework can track metadata regarding the extension fields (e.g., whether a particular table has an extension table for a particular tenant, the name of the extension table, or the like).

The system 100 and any of the other systems described herein can be implemented in conjunction with any of the hardware components described herein, such as the computing systems described below (e.g., processing units, memory, and the like). In any of the examples herein, the inputs, outputs, and tools can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing and software-as-a service (SaaS) techniques can be applied to give tenants the ability to perform the described techniques via a rich Internet application without concern over the actual computing infrastructure needed or used to operate the servers, which can be administered by a business entity different from the tenant user.

Example 3

Exemplary Method Implementing Field Extensibility

Figure 2:
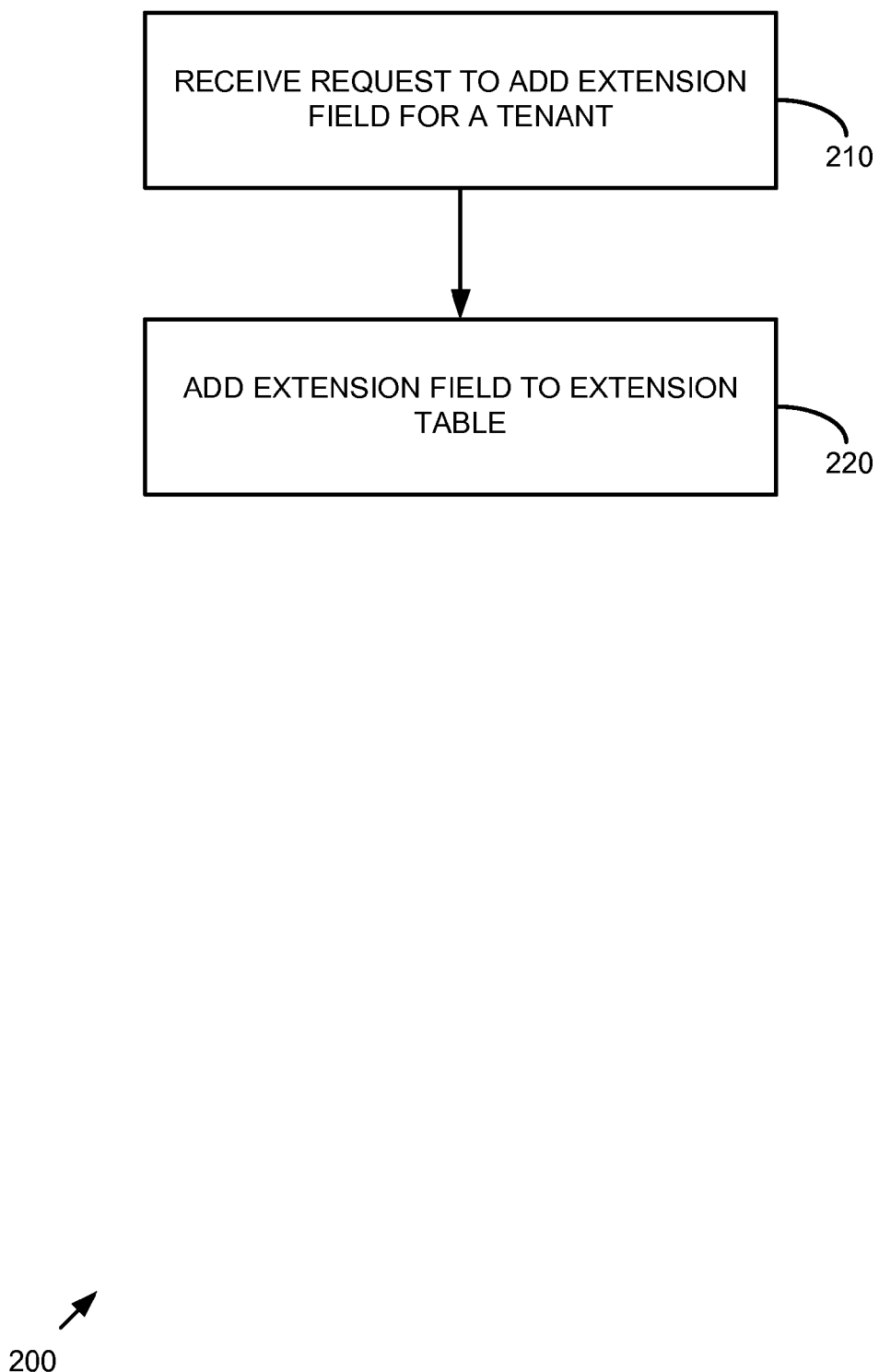
FIG. 2 is a flowchart of an exemplary method of implementing field extensibility via extension tables.

FIG. 2 is a flowchart of an exemplary method 200 of implementing field extensibility via extension tables and can be implemented, for example, in the system shown in FIG. 1. In the example, field extensibility is implemented by adding a new field to an extension table.

At 210, a request to add an extension field for a tenant is received. The request typically indicates that the extension field is to be added to a particular database table incorporated into a multi-tenant environment. For tables representing business object nodes, the table can be specified by specifying the associated business object node. Such requests can be received programmatically by specifying the target table or node, along with the one or more fields to be added.

Extension fields to be added can be specified by field name and data type. Thus, the extension fields can be added to the extension table in a fully typed way (e.g., generic field types can be avoided). Such an arrangement is compatible with the in-memory, columnar database described herein.

A user interface can be provided such a field can be added for a tenant. For example, in a cloud computing scenario, an administrative user can access a list of fields present in a business object node and add a new field with a specified type.

At 220, the extension field is added to an extension table for the database table. The created extension table can be associated with the tenant and the database table (e.g., with the business object node represented by the database table). In practice, it can first be determined whether such an extension table exists. If not, an empty extension table can be created before the extension field is added to the extension table.

Persistence functionality for the extension field can be automatically generated. For example, the field can be added to a user interface for editing, the value (e.g., characteristics) can be saved to the database via the user interface, editing functionality can be provided, and the like. Data models and metadata can be updated to reflect that the extension field exists.

An alternative approach is to create extension tables in advance (e.g., when setting up the tenant, before the request is received, or the like). Further, empty records (e.g., a record for each instance in the core table) can be placed in the extension table to avoid having to do so when the first extension field is added.

After an extension field is added to the extension table, data for the extension field (e.g., separately or along with other fields) can be added, inserted, saved, edited, deleted, and the like as described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Exemplary Association of Extension Table

In any of the examples herein, an extension table can be associated with the respective tenant and the database table that is being extended. Such an association can be achieved via a naming convention (e.g., incorporating the represented business object node instance identifier and tenant identifier as described herein) that identifies the table as associated with the tenant and database table, associations stored in metadata, or the like. An association with the database table being extended can be achieved by associating with the business object node being extended (e.g., the business object node represented by and corresponding to the table being extended).

Example 5

Exemplary Extension Table Creation

In any of the examples herein, when creating an extension table, the table can be filled with instances to match (e.g., have the same primary key as) the instances in the core table. However, it may be desired to have instances in the extension table only for those instances in the core table that have values for the extension fields. It is possible that one or more instances in the extension table do not have values for the extension fields.

In case the extension table is created on request (e.g., when the first extension field is added to a business object node) rather than in advance, the table need not be populated with instances that just contain the primary key and nothing else.

Example 6

Exemplary Tenants

In any of the examples herein, a tenant can be one of a plurality of customers supported in a multi-tenant system.

Typically, a tenant is a logically separate organization or entity. For testing or organizational purposes, the same entity can use more than one tenant.

In a multi-tenant environment, the same overall structure (e.g., the same core database tables, business object nodes, and the like) of a service offering can be presented to multiple tenants. However, in practice, principles of isolation are applied so that one tenant cannot see or be aware of data for other tenants supported by the system. Thus, the extension table for one tenant is isolated from other tenants (e.g., is isolated for access by only one of the tenants), and one tenant cannot observe or even be aware that a business object node of another tenant has extension fields. As a result, different tenants may be offered the same fundamental functionality by a service provider, but customizations can be supported for different tenants to allow flexibility.

A tenant can be a separate customer, department, division, business unit, or the like. In practice, different tenants can have different business arrangements with the service provider due to different business requirements. In a cloud-based scenario, initial business arrangements can be predetermined to allow easy service startup.

In some cases, a tenant may seek the assistance of the service provider or a third party (e.g., consultant) to take advantage of the technologies described herein.

Example 7

Exemplary Multi-Tenant Environment

In any of the examples herein, a multi-tenant environment can support a wide variety of business software functionality, including transactional and analytical database processing services. Such services can be provided via a cloud-based computing scenario, software-as-a-service scenario, or the like.

For example, an online processing (OLTP) services runtime can comprise business object business logic of the supported business objects and is operable to provide OLTP services to a tenant via a single persistence stored in a database. The aggregated business logic of different business object types can form a business logic layer in the business object model to provide OLTP services to business object consumers. A business object has its own business object implementation in actions, validations, determinations, and the like. Certain business logic can be shared among business objects, such as create, read, update, delete, lock, unlock, transactional behavior, and the like.

An online analytical processing (OLAP) services runtime is operable to provide OLAP services to consumers via the single persistence (e.g., the same single persistence used by the OLTP services runtime).

Tenants can access the services provided by the software according to a business object model that can be used to fulfill OLAP services requests. The business object model can include conventions for representing different business object types and persisting the fields of business object instances (e.g., saving characteristics for the fields). For example, business object functionality can be implemented by accessing the business object business logic according to the model. The structure of business objects and relationships between them can be represented in a business object metadata repository. Although a business object's metadata logically belongs to the business object, they are stored in the business object metadata repository. In this way, the system can support a plurality of business objects.

Example 8

Exemplary Database

In any of the examples herein, the technologies can be implemented in an in-memory, columnar database. The in-memory database can serve as the primary persistence for the data. In a cloud-based solution, memory storing the database can be maintained at (e.g., hosted by) the service provider for access by the tenant. From a tenant perspective, the in-memory aspect of the database can be technically transparent. So, a tenant can specify an in-memory database as a data source like any other data source.

Such a database can be optimized for columnar access (e.g., be of or support a columnar layout).

Such a database can be optimized for operations performed directly on the database in memory. For example, joins and unions need not be generated by retrieving database contents and then calculating a join or union.

Due to the columnar and in-memory aspects of the database, searches and other operations can be performed on columns (e.g., in the database or views of the database) as if the columns were indexed or if it were the primary key of the table, even though a separate traditional index need not be implemented.

Such an arrangement can allow tenants to work with business data at a speed that is unprecedented. Both transactional and analytical processing can be performed using the in-memory, columnar database (e.g., based on SAP HANA technology).

The extension table can support columnar queries that can be performed with unprecedented speed in conjunction with an in-memory, columnar database. The extension table itself can be implemented as an in-memory columnar database.

Example 9

Exemplary Fields

In any of the examples herein, a database table can have one or more fields. Such fields can take a variety of forms and can have an associated field type.

Because a business object can be represented by one or more database tables, the business object can thus be persisted by the associated tables. In the context of a business object, the fields are sometimes called "attributes."

A business object attribute definition can specify a name and data type for the business object attribute. An instance of the business object then reflects a particular value for the business object attribute (e.g., according to the data type). As described herein, derived attributes can be calculated mathematically or otherwise derived from other attributes.

As described herein, extension attributes (e.g., additional fields sometimes called "extension fields") can be added to a business object type definition to customize a business object. An extension field can have the same behavior as an ordinary field. For example, it has a name, data type, and the like. In practice, attributes can be organized by being associated with particular nodes of a business object.

Special data types, such as amount or quantity can be supported by the system, typically implementing a pair of fields: a scalar value and an indicator of the units (e.g., a currency or quantity unit code).

Example 10

Exemplary Extension Table

FIG. 3 is a block diagram of an exemplary extension table arrangement 300. In the example, a core table 310 is extended by two different extension tables 320A, 320B for two different tenants. In practice, there can be additional tenants, and some tenants may not have an associated extension table (e.g., no extension fields have been added for the core table for the tenant).

As described herein, the core table 310 can represent a business object node. In such an arrangement, the extension tables 320A, 320B extend the fields of the business object node. For an extended business object node, the core table 310 is accompanied by a separate table for each tenant that contains the extension fields. The business object node is not only reflected by a data base table 310 for the core fields, but also has a separate table per node and tenant that contains the extension fields.

As shown, the core table (e.g., the table being extended) 310 comprises one or more fields (F) that can persist characteristics for the fields therein. The core table 310 further comprises a tenant identifier that indicates for which tenant the instance in the table is persisted. Further, a node instance identifier (e.g., record identifier) is also present, which is unique across business objects. Thus, the primary key of the table is a combination of the tenant and node instance identifier.

A join using the primary key that is performed on the core table 310 and one of the extension tables 320A, 320B for a tenant thus results in data for only one of the tenants, but extended via the extension fields in the extension table for the tenant. A left outer join will preserve unmatched rows from the left (i.e., core) table, so that all records in the core table need not have corresponding records in the right (i.e., extension) table.

The extension tables 320A, 320B incorporate (e.g., are created with) the same primary key as the core table 310. Such an arrangement facilitates performing joins on the tables, resulting in a table with the extended fields.

The extension tables 320A, 320B comprise one or more extension fields (EF) as shown. The extension fields can be strongly typed (e.g., contain and be restricted to contain a particular data type such as a date, integer, string, or the like). The type can be specified when the field is created.

As shown, the extension fields can be different for the different tenants. Some extension fields can be blank. Extension fields can comprise customer-specific fields, custom fields, and the like.

Example 11

Exemplary Method Saving Data to a Database

Figure 4:
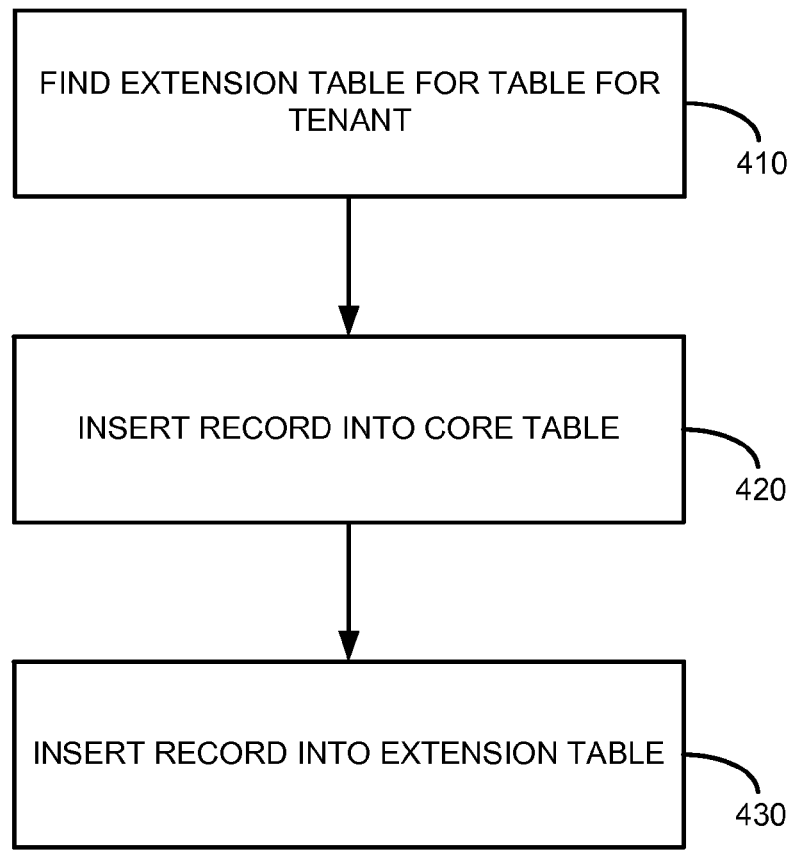
FIG. 4 is a flowchart of an exemplary method of saving data to a database when supporting extensibility fields.

FIG. 4 is a flowchart of an exemplary method 400 of saving data to a database supporting extension fields and can be implemented, for example, in the system shown in FIG. 1, FIG. 3, or the like. The method 400 can be performed responsive to receiving a request to save (e.g., add) data (e.g., a record) to a database table (e.g., representing a business object node). For example, a request to add an instance of an extended business object node to a business object can result in implementation of the described method.

At 410, an extension table is found for the core table for a tenant as described herein.

At 420, a record is inserted into the core table. The core fields can thus be saved (e.g., persisted) to the core database table.

At 430, a record is inserted into an extension table. The extension fields can thus be saved to the extension table.

Thus, when adding a record to a core database table, a corresponding record can be added to the extension table. If desired, a check can be done to see if the extension fields have values (e.g., are non-null). If not, a corresponding record need not be added to the extension table. Thus the method comprises adding a corresponding record to the extension table when at least one extension field in the record has a value.

Example 12

Exemplary Method Reading Data from a Database

Figure 5:
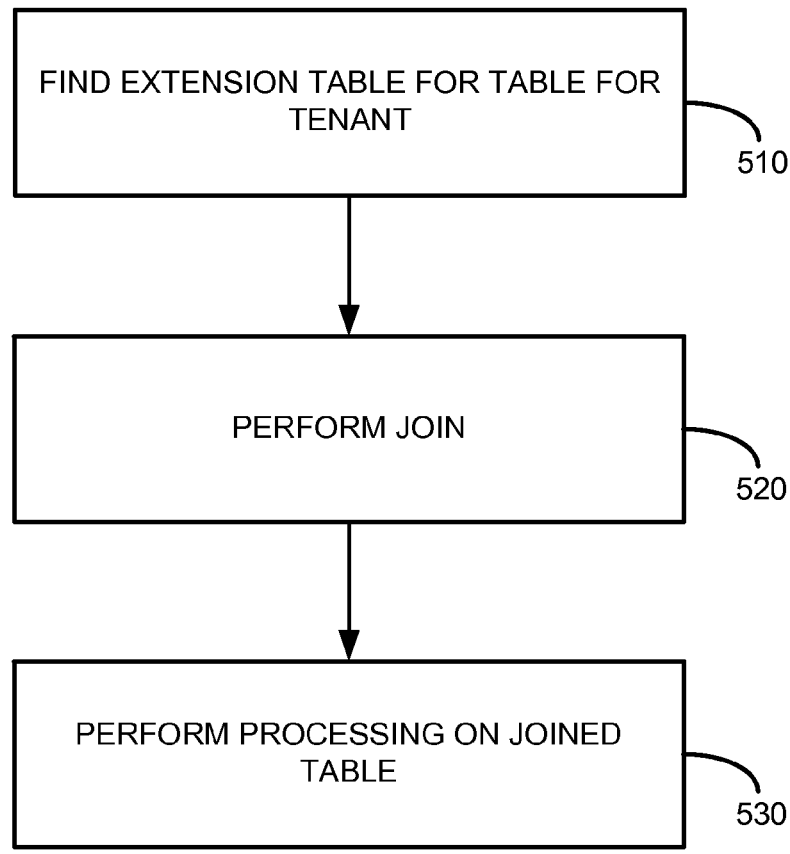
FIG. 5 is a flowchart of an exemplary method of performing processing for a business node having extensibility fields.

FIG. 5 is a flowchart of an exemplary method 500 of reading data from a database supporting extension fields and can be implemented, for example, in the system shown in FIG. 1, FIG. 3, or the like. The method 500 can be performed responsive to receiving a request to read data from a database table for a tenant from a database table incorporated into a multi-tenant environment. For example, such a request can take the form of a request to read data from a business object node (e.g., represented by the table).

At 510, an extension table is found for the core table for a tenant as described herein. The operation (e.g., read or the like) is then performed on the database table and the extension table.

At 520, a join is performed on the core table and the extension table, resulting in a joined table. As described herein, a left outer join can be performed.

At 530, processing is then performed on the joined table.

If there are modifications to the data, they can be executed via the business object API and lead to two separate updates: first in the core table, then in the extension table. These are performed in one database transaction in order to ensure consistency. Materialized views need not be used to join the two database tables.

In some cases, rather than performing a join, two selects can be performed (e.g., to both tables), and the data can be combined (e.g., mixed into the proxy structure by which software accesses the data). So, rather than having the database do the join work, code can perform two selects on the database and combine the information via a join.

For consumers, the join can be performed by the framework. Usual processing and access to the data can remain unchanged, and extension fields can be transparent. The tenant-dependent extension fields can appear as part of the business object node (e.g., as part of the proxy structure) and can be processed as any other field.

In some cases, consumers can bypass provided functionality and access the database directly (e.g., via SQL SELECT statements). In such a case, consumers can find the name of the extension table as well and perform an SQL LEFT OUTER JOIN as described herein.

Example 13

Exemplary Finding an Extension Table

In any of the examples herein, an extension table can be found for a particular core table for a tenant. The result can be an identifier (e.g., name) for the extension table. In practice, it can be first determined whether an extension field is present for the core table. For example, it can be determined whether there are any extension fields (e.g., one or more extension fields) for the business object node represented by the core table. If there are no extension fields, further extension field processing need not be performed. Alternatively, a result of none or null for the extension table can indicate that there are no extension fields for the table for the tenant.

Example 14

Exemplary Extension Field Framework

In any of the examples herein, an extension field framework can track which tables or business object nodes have extension tables or extension fields. The framework can respond to a request for the extension table or a particular tenant, business object node combination and indicate whether there are any extension fields at a particular business object node or not.

The identifier of an extension field can also be provided or implied as described herein.

Example 15

Exemplary One-to-One Relationship Between Business Object Nodes and Database Tables In the core business object model, a name is specified for the database table of each business object node. Corresponding to the core table, an extension table can be generated for each tenant (e.g., for which extended fields are added to the node).

Figure 6:
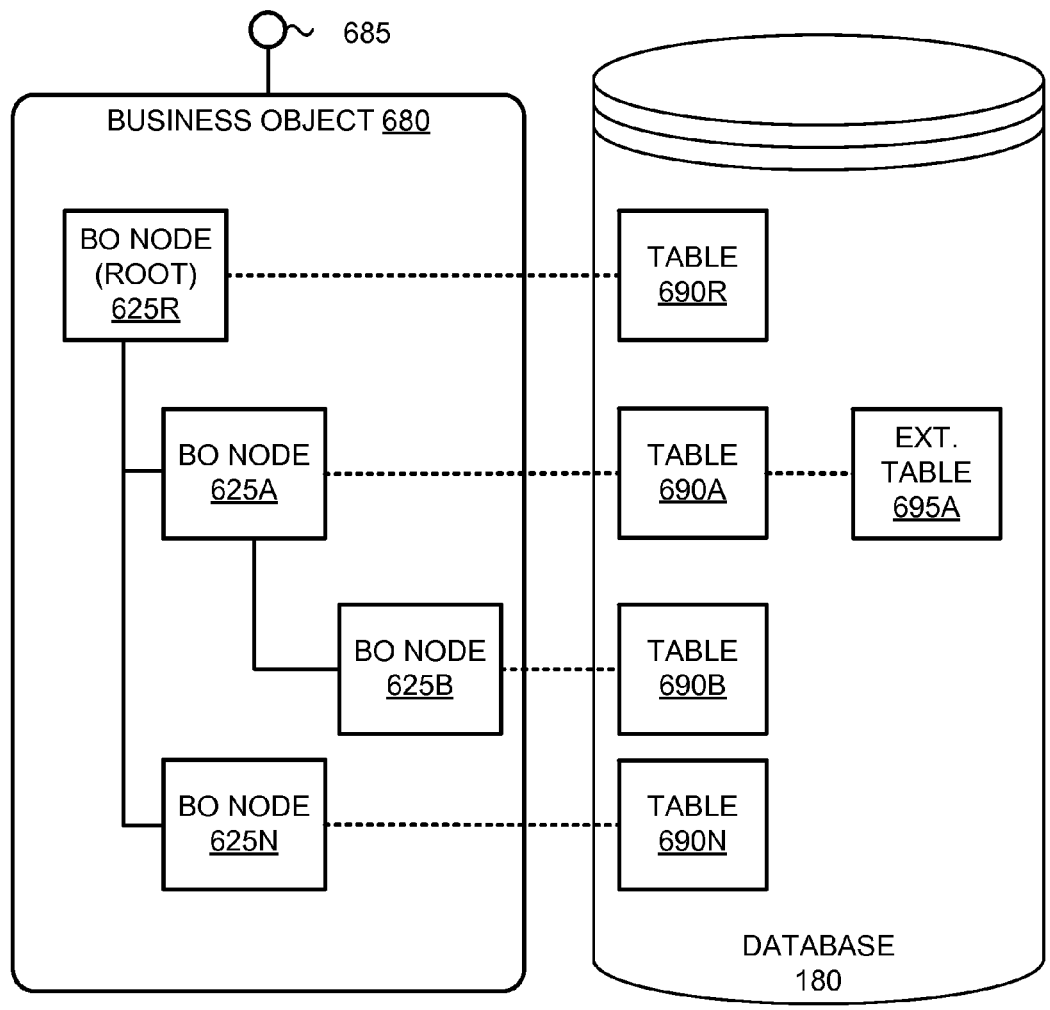
FIG. 6 is a block diagram of a system implementing a one-to-one relationship between business object nodes and database tables in an extension table scenario.

FIG. 6 is a block diagram of an exemplary system 600 implementing a one-to-one relationship between business object nodes 625R, 625A-N and core database tables 690R, 690A-N in an extension field scenario for a particular tenant. In the example, a business object 680 (e.g., accessed via interface 685) comprises one or more business object nodes 625R, 625A-N. The business object nodes 625R, 625A-N have states (e.g., characteristics for business object attributes) that are persisted (e.g., stored) in respective tables 690R, 690A-N in a database 180. In practice, the nodes can be stored in a hierarchy so that some nodes (e.g., 625B) are hierarchically underneath others (e.g., 625A). A root node 625R can be uniformly included in business objects for the sake of consistency and to act as a header node.

In the example, there is an extension table 695A that extends the core table 690A. Thus, the extension table 695A extends the fields in the business object node 625A. The example shown is for a particular tenant. In cases where extension fields are added to a particular node or table for more than one tenant, more than one extension table 695A can be present. Thus, in the one-to-one relationship between nodes and tables, the extension table is considered part of the core table (e.g., the one-to-one relationship is supplemented by the extension table to be a one-to-one-to-one relationship when an extension table is present). From the tenant perspective, there is a one-to-one relationship (e.g., per tenant) between the business object node and the core table/extension table pair, if there is an extension table. From the service provider perspective, there is a one-to-one-to-many relationship between the business object node, the core table, and the extension tables (if multiple tenants have extension fields for the core table).

Rather than access the fields of a business object node directly (e.g., in the table representing the business object node), a proxy structure can be provided by which programmatic access to the fields can be achieved.

Maintaining such a one-to-one relationship can facilitate OLAP processing on the business objects because persistence scheme idiosyncrasies of the business object are avoided (e.g., the persistence scheme transparently follows the business object node structure). Thus, transactional and analytical processing need not go through the business object logic and can instead go directly to the table structure, resulting in more easily understandable access and better performance.

Example 16

Figure 7:
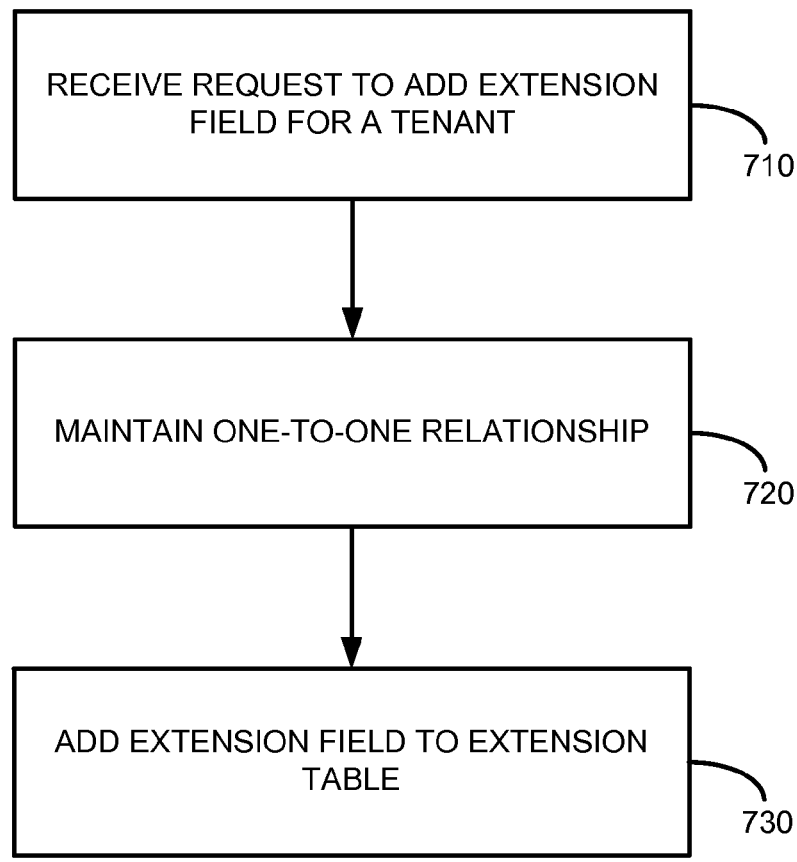
FIG. 7 is a flowchart of an exemplary method implementing a one-to-one relationship in an extension table scenario.

Exemplary Method of Maintaining One-to-One Relationship Between Business Object Nodes and Database Tables FIG. 7 is a flowchart of an exemplary method 700 implementing a one-to-one relationship between business object nodes and database tables in a development scenario and can be implemented, for example, in the systems described herein. In any of the examples herein, a business object can comprise one or more business object nodes, and a one-to-one relationship can be maintained between business object nodes and core tables in the database, even if business objects are customized by changes.

At 710, a request to add an extension field for a tenant is received. Such a directive typically occurs at when a standard application is adapted to customer-specific needs by a customer or partner. For example, such a request can specify that an extension field (e.g., new field) is to be added to a business object (e.g., to one of the business object nodes of the business object type definition). As described herein, such directives can be accomplished by a user taking advantage of a rich Internet application interface.

At 720, a one-to-one relationship is maintained between the business object nodes and core database tables (e.g., as shown in FIG. 6). As described herein, the extension table is considered part of the core table for purposes of the one-to-one relationship from a tenant perspective. The extension table can thus be a per-tenant, per-business object node table.

At 730, the directive is implemented. As described herein, the directive can be implemented in a SaaS or cloud computing scenario, and subsequent processing and storage of the changed business object is implemented in such a scenario. Implementing the directive can include automatically putting default behavior (e.g., persistence behavior or the like) into place by generating business logic and modifying the business object metadata (e.g., without coding).

Thus, when a database table comprises a business object node table corresponding to a business object node (e.g., one of a plurality of business object nodes for the business object), a one-to-one relationship can be maintained when extending the business object node table with an extension table.

Example 17

Exemplary Business Object Nodes

In any of the examples herein, a business object can comprise one or more business object nodes. Although any number of arrangements is possible, a hierarchical arrangement can provide certain advantages. For example, a root node (e.g., header node storing header data) can be defined as a starting point when interacting with an instance of the business object. Further nodes (e.g., item nodes, etc.) can be defined under the root. Different nodes in the business object can have different cardinality (e.g., a single sales order having a root node can have multiple sales items in plural instances of an item node underneath the root).

A business object node can have one or more fields (e.g., attributes) and can also specify associations (e.g., foreign keys). The node can also have associated behavior in the form of actions or methods. For example, an item node may have actions called "approve," "reject," "copy," or the like.

Pre-configured business objects can have nodes that already perform expected behavior (e.g., create, read, update, and delete) from when they are first provided to a developer (e.g., by default, in an out-of-the-box situation). Such an approach promotes uniformity and avoids errors in code, and also makes the system easier to support. Even newly created business objects can have default functionality (e.g., including persistence functionality) generated upon development, avoiding coding by the developer.

In practice, a node refers to the collection of instances for a particular node type incorporated into a business object definition. The same node type can be reused for other business object definitions. A unique identifier can be used to differentiate nodes in such situations.

Metadata can be associated with business object nodes to indicate various attributes (e.g., which business object nodes are extensible).

Example 18

Exemplary Extension Table Name Generation

When generating a name for an extension table, a technique can be used so that the name is unique across business objects and tenants in the multi-tenant environment. The name can also be reproducible as described herein. Because the namespace can become quite crowded and the length of the name may be limited, various techniques can be used to ease the name generation process. Name generation can be applied when creating or looking up an extension table. However, the extension table name can be saved by the extension field framework, which can provide it upon request.

Figure 8:
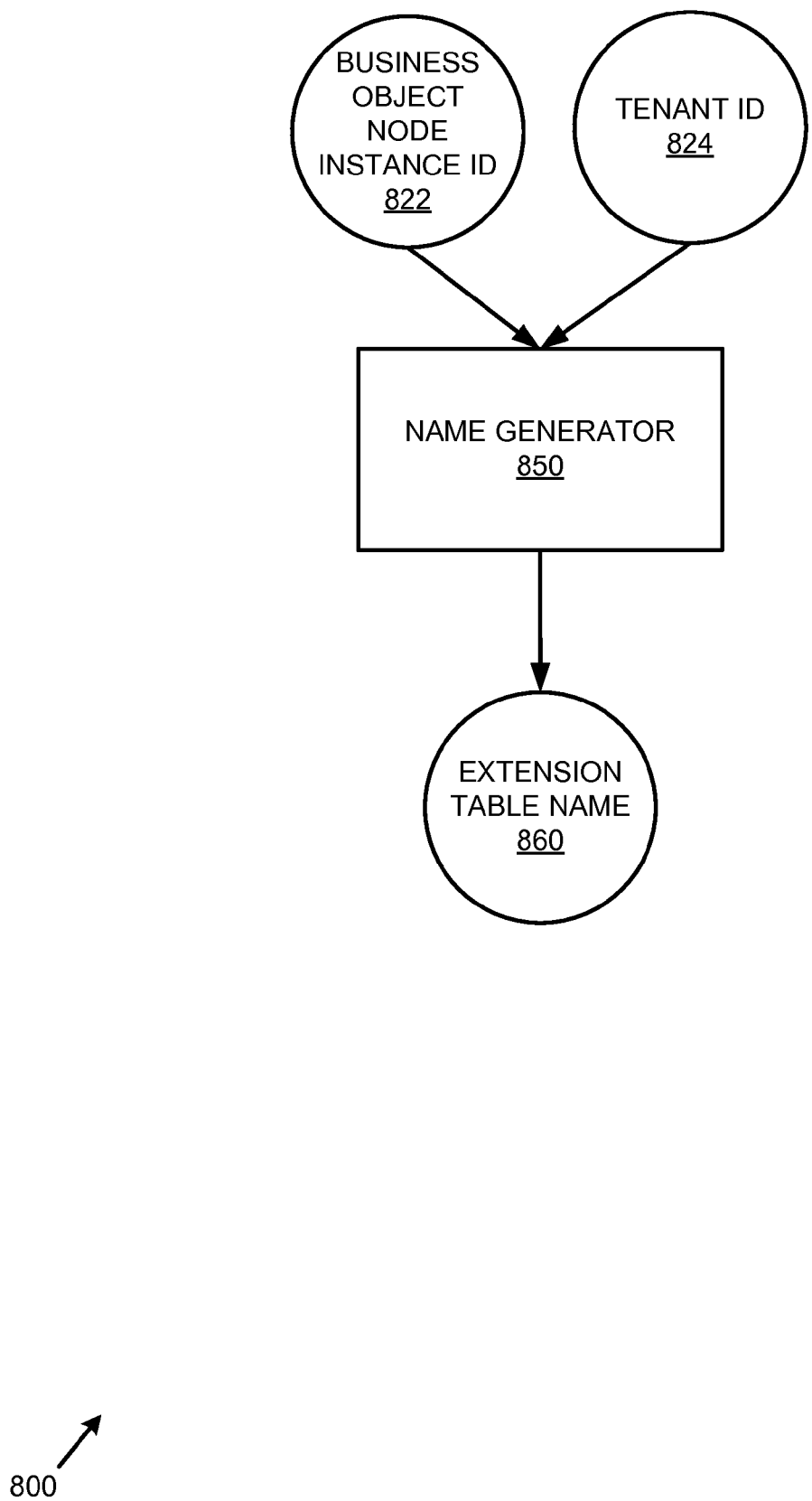
FIG. 8 is a block diagram of a system naming extension tables in a system supporting business object nodes and database tables in an extension table scenario.

FIG. 8 is a block diagram of a system 800 naming extension tables in a system supporting business object nodes and database tables in an extension table scenario. In the example, the name generator 850 accepts the business object node instance identifier 822 and the tenant identifier 824 as input and generates the extension table name 860 as output. In any of the examples herein, an extension table name can incorporate an identifier of the business object node that is extended and an identifier of the tenant. Name reproducibility can be supported for the combination of business object node and tenant. Thus, table handling and error analysis can be facilitated (e.g., the names can easily be reproduced based on a given business object node and tenant, and is unique despite being so reproducible).

A tenant-unique identifier is useful for differentiating among tenants. Other factors can be taken into account. For example, to ensure that the name 860 is unique across the system, namespace considerations can be used. For example, a generation namespace technique can be used (e.g., a generation namespace string can be added to the name 860) to ensure uniqueness without resorting to user input.

The resulting name of the extension table (e.g., including the tenant identifier) can be part of the business object load in order to facilitate quick access to the name for all consumers.

Other arrangements are possible. For example, a version (e.g., abbreviated) of the core table name can be used in combination with a tenant identifier. Other data or characters can be included as desired.

Example 19

Exemplary Method of Naming Extension Tables

Figure 9:
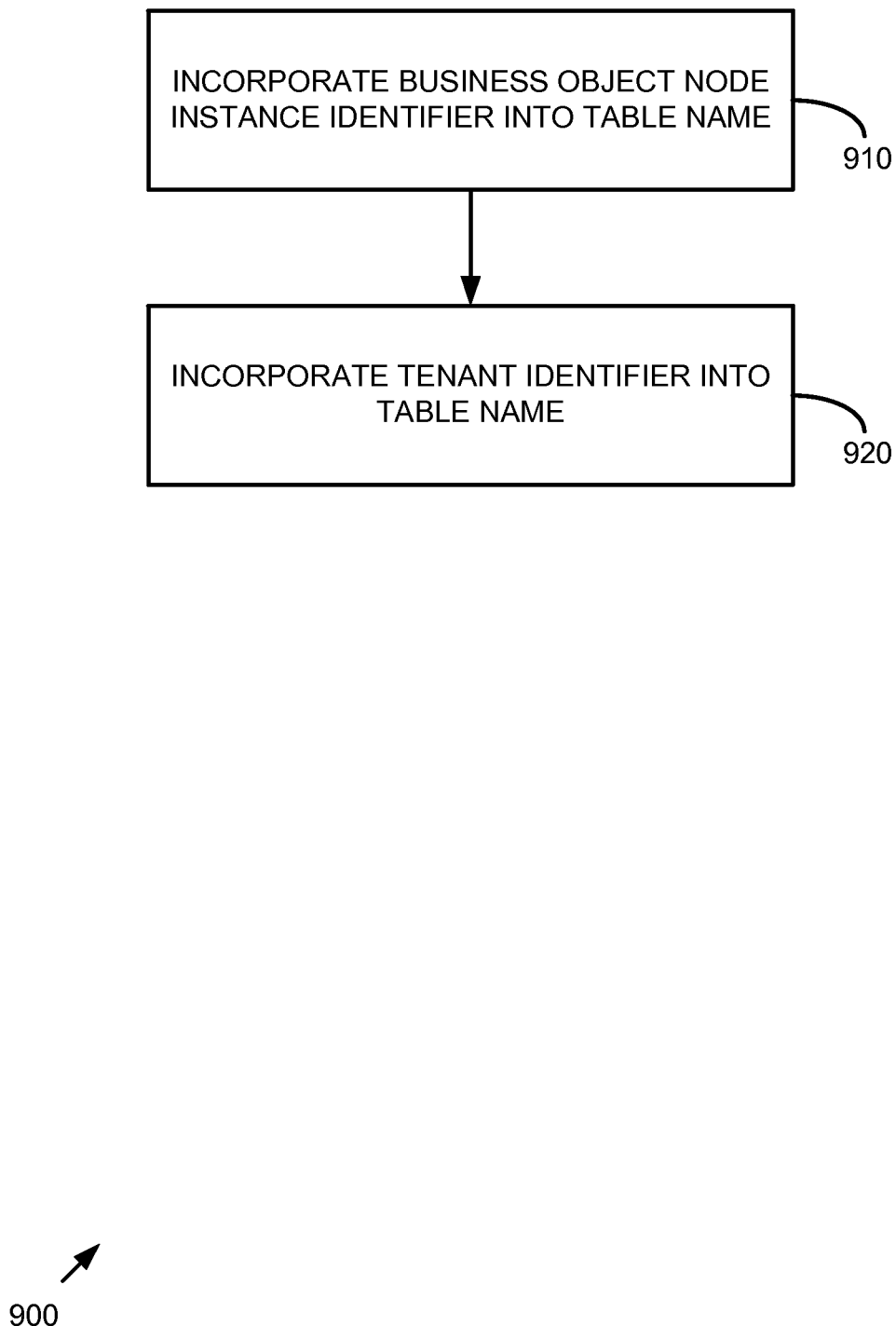
FIG. 9 is a flowchart of an exemplary method of naming an extension table based on business object node instance identifier and tenant identifier.

FIG. 9 is a flowchart of an exemplary method 900 of naming an extension table based on business object node instance identifier and tenant identifier and can be implemented, for example, in the system shown in FIG. 8. The method 900 can be performed responsive to receiving a request for the extension table name.

At 910, the business object node instance identifier (e.g., of the node that is extended) is incorporated into the extension table name.

At 920, the tenant identifier is incorporated into the extension table name.

The identifiers can be concatenated or otherwise combined.

Example 20

Exemplary Extension Table Life Cycle in Multi-Tenant Scenario

FIGS. 10A-D are block diagrams of an exemplary extension table implementation 1000 showing table life cycle in a multi-tenant scenario.

FIG. 10A shows a core database table 1010 that represents the root node of a business object (e.g., "opportunity").

FIG. 10B shows a table set 1020 including an extension table for the core database table shown in FIG. 10A. In the example, extension fields "color," "category," and "paper" have been added via technologies described herein. No values (e.g., characteristics) are present for any of the extension fields. In practice, it is possible to omit records when there are no characteristics for any of the extension fields.

FIG. 10C shows a table set 1030 in which a record having characteristics (e.g., values) for some of the fields has been added to the table set 1020.

FIG. 10D shows a table set 1040 in which a field for a record has been edited by adding a characteristic (e.g., "002" for "category").

Example 21

Exemplary Extension Table Life Cycle Method in Multi-Tenant Scenario

Figure 11:
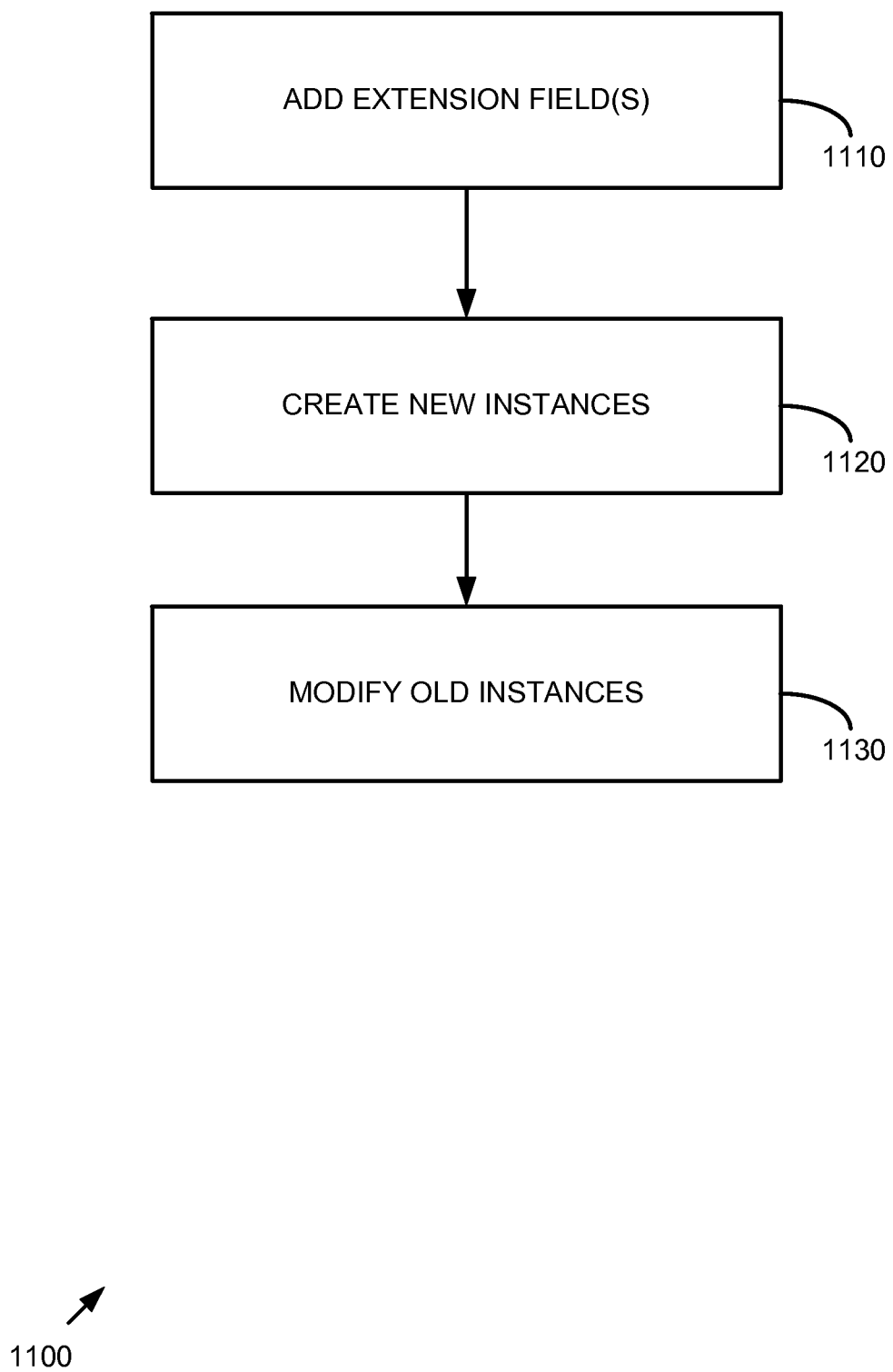
FIG. 11 is a flowchart of an exemplary method of implementing extension tables in a multi-tenant scenario.

FIG. 11 is a flowchart of an exemplary method 900 of implementing extension tables in a multi-tenant scenario and can be implemented, for example, in the system shown in FIGS. 10A-D.

At 1110, extension fields are added (e.g., created) for a business object node represented by a table.

At 1120, new instances are created (e.g., added to the tables) for a business object node represented by a core table and an extension table.

At 1130, old instances are modified. For example, changes to data in the core table, the extension table, or both can be made.

Example 22

Exemplary User Interface

To avoid lengthy configuration processes, business objects can be provided as part of a pre-configured software package (e.g., for human resources, finance, shipping, customer relationship management, or the like). For business objects in such a package, a request can be received to add a new field of a specified data type to a node of the business object.

Responsive to such a request, the new field of the specified data type can be added to an extension table associated with the business object node.

A design tool can then be presented by which an indication can be received of where input for the new field is to be received on a user interface. Subsequently, when the user interface is used to add data to the database, corresponding data is also added to the extension table as described herein.

Example 23

Exemplary Further Details

In some cases, it may be desirable to add the same extension field to a plurality of tenants (e.g., as part of an upgrade or the like). In such a case, the field can be added for each tenant where the business object enhancement is desired.

Example 24

Exemplary Business Objects

Figure 12:
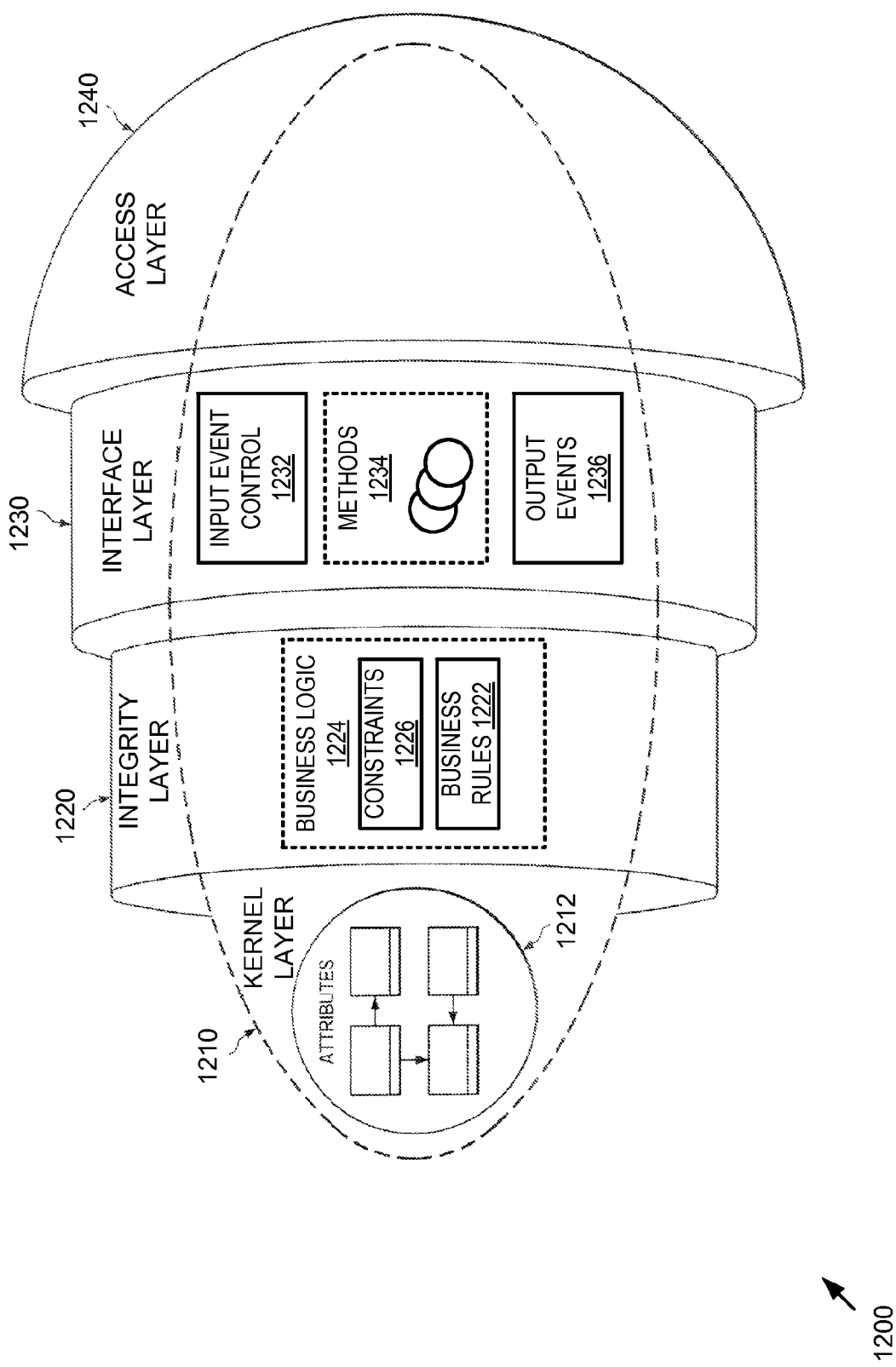
FIG. 12 is a block diagram of an exemplary business object.

FIG. 12 is a block diagram of an exemplary business object 1200. In any of the examples herein, a business object can take the form of a programmatic object that holds a set of instance variables (e.g., attributes, values, properties, characteristics, or the like). Associations between business objects of different types can be stored in metadata (e.g., as part of a data model), which results in a collection of business objects representing business relationships. The business object can be a software model representing real-world items used in a business transaction. For example, a business object may represent a business document (e.g., sales order, purchase order, production order, invoice, etc.), master data objects (e.g., product, business partner, employee, piece of equipment, etc.), or the like. In the case of a product, the business object instance can represent an actual product (e.g., with attribute values for an identifier, price, description, length, volume, or the like).

In any of the examples herein, a universe of business objects can be created and configured to operate in concert in a particular problem domain. As described herein, extension attributes and other customization techniques can be used to tailor a universe of business objects to a specific implementation. Such customizations can be achieved in many cases without coding on the part of the developer.

Business objects can support behaviors via invocation of one or more business object programmatic actions (e.g., programmatic methods), through which clients of the business objects can perform operations on the business object (e.g., on the instance variables). Such actions are typically provided via a programmatic interface that supports one or more parameters that perform a task associated with the action (e.g., cancel an order, hire an employee, change a customer classification, create a target group, and the like).

In the example, the business object 1200 can be defined to contain multiple layers. Exemplary layers include a kernel layer 1210, which represents the object's inherent data, comprising attributes (e.g., fields) 1212 of the defined business object. An integrity layer 1220 can contain the business logic 1224, which can include business rules 1222 for consistent embedding in the system and the constraints 1226 regarding the values and domains that apply. For example, business logic 1224 can comprise statements that define or constrain some aspect of the business, such that they are intended to assert business structure or to control or influence the behavior of the business entity. It may pertain to the facts recorded on data and constraints on changes to the data. The business logic 1224 can thus determine what data may or may not be recorded in the business object 1200.

The interface layer 1230 can supply valid options for accessing the business object 1200 and describe the implementation, structure, and interface of the business object to the outside world (e.g., the analytical report tool described herein). The interface layer 1230 typically contains programmatic methods 1234 (e.g., invocable to perform the actions described herein), input event controls 1232, and output events 1236.

The access layer 1240 can define the technologies that can be used for external access to the business object's data. Possible technologies can include Hypertext Transfer Protocol (HTTP), Java, COM/DCOM/COM+/.NET (e.g., based on the Component Object Model of Microsoft Corporation), CORBA (Common Object Request Broker Architecture), RFC (Remote Function Call), and the like. Additionally, the business object can implement object-oriented technologies such as encapsulation, inheritance, polymorphism, or combinations thereof.

A special case of a business object called a "business configuration object" (BCO) can be used when actions are not needed. For example, a code list (e.g., list of possible selections for an attribute) can be implemented as a BCO. BCO instances can be delivered to a customer via a business configuration schema technique. Any number of other BCO implementations are possible (e.g., PartyDeterminationRule, PurchasingContractExpiryNotificationSpecification, TripServiceProvider, PublicHolidayProperties, or the like).

Systems that employ business objects in an intelligent way can offer a rich set of reusability to non-technical users because the business objects can represent easily understandable real-world items such as an order, customer, supplier, invoice, and the like. Similarly, actions on the business objects can reflect real-world tasks (e.g., business processes, etc.) as described here.

Example 25

Exemplary Analytical Processing

In any of the examples herein, online analytical processing, including analytical processing (OLAP) can be used as a tool to explore data sources (e.g., typically database tables combined by joins, unions, or the like). In practice, online analytical processing involves multi-dimensional analytics, dimensional models, star schemas, snowflake schemas, data cubes, pivot tables, or the like.

An online analytical processing session can be based on an analytical report, which specifies data sources and relationships between such sources for the analytical report. As described herein, an OLAP session can be constructed with reference to a data model that includes at least one business object designated to model data from a data source.

Upon activation of the analytical report, an online analytical processing session begins. The session can then support navigation within the data (e.g., adding or removing certain dimensions, drilling down, slicing and dicing, consolidating data via rollups and aggregation, and the like). Thus, the data model allows ad-hoc navigation throughout the data. In the case of warehoused data such as a data cube, the user can navigate the data throughout the cube.

Although the data used for online analytical processing is traditionally separated from that used in online transaction processing (e.g., into a data warehouse), it is possible to support online analytical processing that draws from the same data sources as those used for online transaction processing.

For example, via the extension field technology described herein, a request to perform online analytical processing on a view of data comprising the extension field can be fulfilled via the extension field. A join as described herein can be used to incorporate the extension field with fields from the core table. The analytical processing can then be performed on the resulting joined table.

Example 26

Exemplary Business Object Consumer

In any of the examples herein, a consumer of business objects can be any software accessing online transaction processing (OLTP), online analytical processing (OLAP), or other services associated with a business object.

As described herein, such consumers can execute on any of a variety of computing systems, including cloud-based arrangements, and the like.

Example 27

Exemplary Business Object Support

In any of the examples herein, the technologies can support business objects. For example, a business object services provider can execute at runtime, interpret the business object model, and provide business object services such as implementing business object behaviors, based on the business object model and the metadata associated with the business object type of a business object instance. Such support can be partly interpreted and partly implemented by code automatically generated according to the business object model (e.g., code implementing default behavior, code implementing customized behavior, or both).

Example 28

Exemplary OLTP Services

In any of the examples herein, create, read, update, and delete functionality can be implemented by an OLTP services runtime. Such functionality can be implemented in a transaction-safe manner and support enterprise class database processing.

Example 29

Exemplary Business Logic

In any of the examples herein, business logic can be the logic implemented by a business object to perform its operations on data, such as business object attributes. For example, determinations, actions, and validations can be performed to accomplish business process tasks. The aggregated business logic of different business object types can form a business logic layer in the business object model.

Example 30

Exemplary Business Object Metadata Repository

In any of the examples herein, a business object model can comprise a business object metadata repository that stores business object configuration information (e.g., data describing business objects, their attributes, and relationships between them). Such metadata can be separated from the business object business logic (e.g., be stored as accessible attributes that can be evaluated rather than being executed as code). By splitting some business object configuration information out of the business object business logic, certain aspects of the system can bypass the business logic, resulting in improved performance.

The metadata repository can be used to generate runtime artifacts and serve as a common transport mechanism for design time and runtime entities. The metadata repository can include an API layer to provide uniform read and write APIs to access repository objects; a repository metamodel that supports simple introduction of new repository objects; a repository runtime that provides transactional services to create and administer repository objects; and a persistency layer that allows repository objects to be stored in several storage types, depending on purpose.

The metadata repository runtime can work under a business object processing framework that can be used as an implementation layer for consistency checks, activation of models, and the like.

When building views involving objects, the metadata repository can assist at design time. Logic can be implemented in code in a code editor and saved in a code repository, which can be referenced in the metadata repository.

Example 31

Exemplary Developers

In any of the examples herein, a developer can be any party or entity configuring software systems for use by users. Developers can include both customers (e.g., customer-level developers who customize and/or extend the system for use by internal customers) and partners. As described herein, customization by internal developers can be greatly simplified in many cases by facilitating addition of extension fields. Default functionality and behaviors can be provided during customization.

Example 32

Exemplary Advantages

In the context of a columnar database, access to extension field values is possible with unprecedented speed (e.g., on par with that of standard fields).

In any of the examples herein, per-business-object node and tenant a separate database table (e.g., extension table) can be provided that contains the customer-specific fields (e.g., extension fields) for the respective tenant.

An alternative approach for extension fields in multi-tenant environments is to persist them in a generic persistence (e.g., using a generic database table with field name/field value pairs). The described technologies can be superior in that a generic persistence approach is not suitable for fast columnar access to the values of one specific field.

Another approach is to use predefined fields (e.g., typed fields which are kept in stock in the database, such as ten fields of type Date, ten fields of type String, etc.). The described technologies can be superior in that there is more flexibility and the tenant is not limited to the fields that are predefined.

The extension table concept can be used by the business object runtime framework or other consumers that access the core table.

At runtime, an SQL join between the core table and the extension table for the respective tenant is executed.

Example 33

Exemplary Computing Systems

Figure 13:
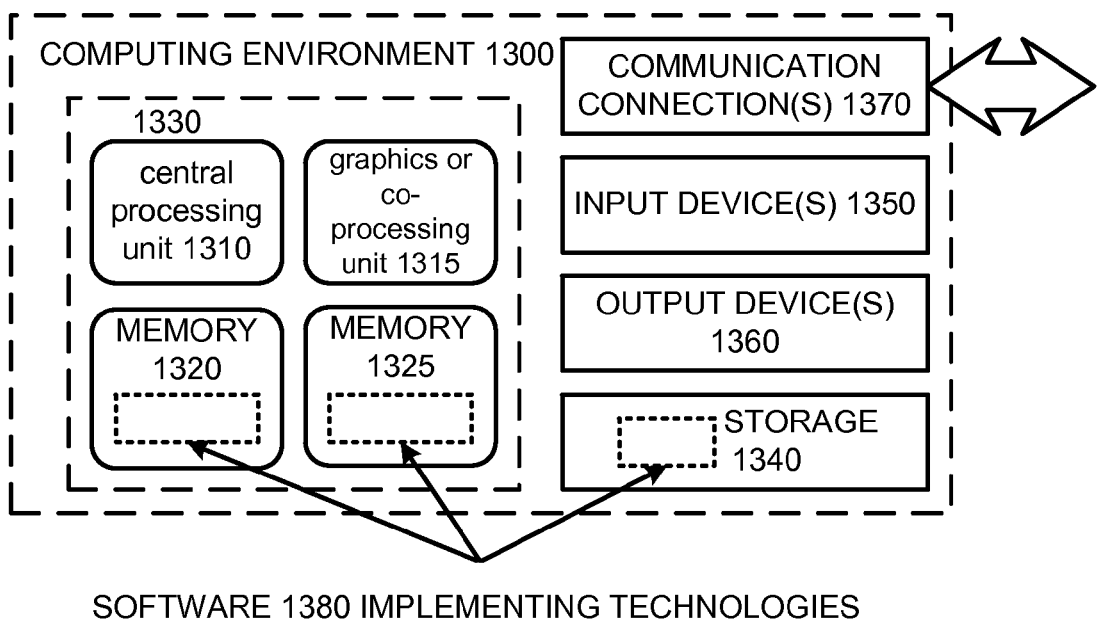
FIG. 13 is a diagram of an exemplary computing system in which described embodiments can be implemented.

FIG. 13 illustrates a generalized example of a suitable computing system 1300 in which several of the described innovations may be implemented. The computing system 1300 is not intended to suggest any limitation as to scope of use or functionality, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s).

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 34

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage devices, optical storage devices, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method implemented at least in part by a computing system, the method comprising:

receiving a request to add an extension field for a tenant to a business object node represented by a database table incorporated into a multi-tenant environment;

responsive to the request, adding the extension field to an extension table for the database table incorporated into the multi-tenant environment;

when processing operations on data associated with the database table, determining whether any extensions have been added;

responsive to determining that extensions have been added, performing a join between the database table and the extension field and performing the operations on the loin; and wherein the extension table is associated with the tenant and the database table, and a name of the extension table incorporates an identifier of the node of the business object and an identifier of the tenant.

2. One or more computer-readable storage devices comprising computer-executable instructions for performing the method of claim 1.

3. The method of claim 1 wherein:
the request comprises a specified data type for the extension field; and
adding the extension field comprises adding a field of the specified data type.

4. The method of claim 1 wherein:
the database table supports columnar layout.

5. The method of claim 1 wherein:
the database table represents a node of a business object.

6. The method of claim 5 wherein:
the database table comprises a business object node table corresponding to the business object node, which is one of a plurality of business object nodes for the business object; and
the method further comprises:
maintaining a one-to-one relationship between business object nodes and business object node tables in a database.

7. The method of claim 1 wherein:
the extension table is isolated from other tenants.

8. The method of claim 1 further comprising:
receiving a request to perform online analytical processing on a view of data comprising the extension field; and
fulfilling the request via the extension field.

9. The method of claim 8, wherein fulfilling the request comprises:
performing a join on the database table and the extension table; and
performing the online analytical processing on the join.

10. The method of claim 1 wherein:
the database table and the extension table incorporate a same primary key.

11. The method of claim 1 further comprising:
when adding a record to the database table, adding a corresponding record to the extension table when at least one extension field in the record has a value.

12. The method of claim 1 further comprising:
generating a reproducible name for the extension table that is unique across tenants in the multi-tenant environment.

13. The method of claim 1 further comprising:
further responsive to the request, generating persistence functionality for the extension field.

14. A system comprising:
a multi-tenant environment providing access to transactional and analytical database processing services to customers via a cloud-based computing scenario, the cloud-based computing scenario comprising one or more processors and memory;
a database representing a node of a business object, wherein the database comprises a business object node table comprising records identified by a primary key;
an extension table associated with a tenant and representing one or more extension fields for the node of the business object, wherein the extension table comprises records identified by the primary key, thereby adding the one or more extension fields to the business object for transactional and analytical processing, and wherein a name of the extension table incorporates an identifier of the node of the business object and an identifier of the tenant;
when processing operations on data associated with the node of the business object, determining whether any extensions have been added; and
responsive to determining that extensions have been added, performing a join between the node of the business object and the extension field and performing the operations on the loin.

15. The system of claim 14 wherein:
the extension table is a per-tenant, per-business object node table.

16. The system of claim 14 wherein:
the business object comprises a plurality of business object nodes; and
a one-to-one relationship between business object nodes and business object node tables is maintained in the database.

17. The system of claim 16 wherein:
the one-to-one relationship is supplemented by the extension table.

18. One or more computer-readable storage devices comprising computer-executable instructions for performing a method, the method comprising:
for a business object included in a pre-configured software package, receiving a request to add a new field of a specified type to a node of the business object, wherein the node of the business object is persisted by an in-memory, columnar database;
responsive to receiving the request, adding the new field of the specified type to an extension table associated with the business object node;
receiving an indication of where input for the new field is to be received on a user interface;
when adding data to the database for an instance of the business object node, also adding corresponding data to the extension table for the instance of the business object node;
when processing operations on data associated with the instance of the business object node, determining whether any extensions have been added; and
responsive to determining that extensions have been added, performing a join between the instance of the business object node and the extension field and performing the operations on the loin.

* * * * *

UNITED STATES PATENT AND TRADEMARK OFFICE
CERTIFICATE OF CORRECTION

PATENT NO.         : 9,208,212 B2                                               Page 1 of 1
APPLICATION NO.    : 13/717132
DATED              : December 8, 2015
INVENTOR(S)        : Niehoff et al.

It is certified that error appears in the above-identified patent and that said Letters Patent is hereby corrected as shown below:

In the Claims:

Column 19, Claim 1, line 13, "loin;" should read --join;--.

Column 20, Claim 14, line 25, "loin." should read --join.--.

Column 20, Claim 18, line 61, "loin." should read --join.--.

Signed and Sealed this
Nineteenth Day of April, 2016

Michelle K. Lee
*Director of the United States Patent and Trademark Office*